United States Patent Office.

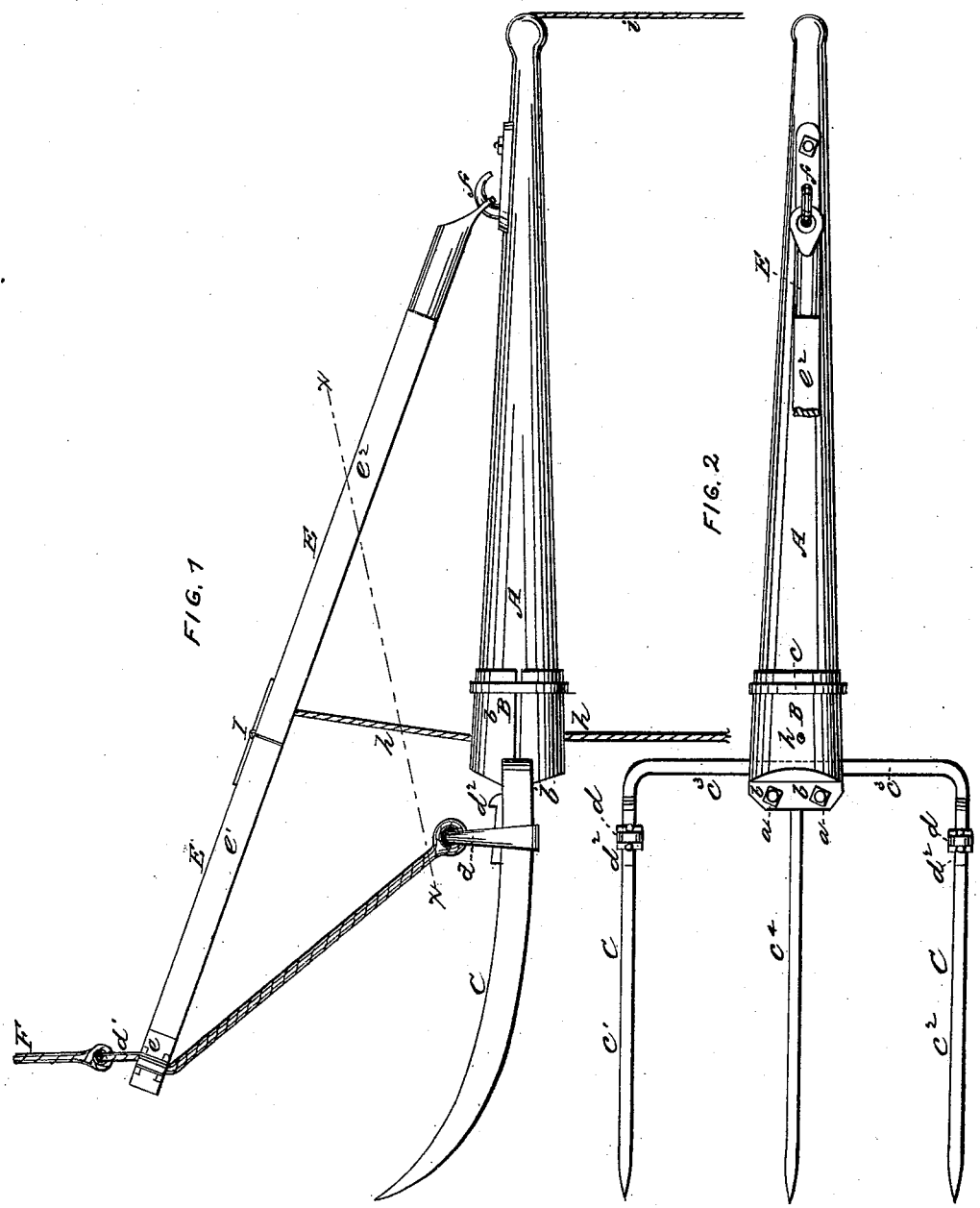

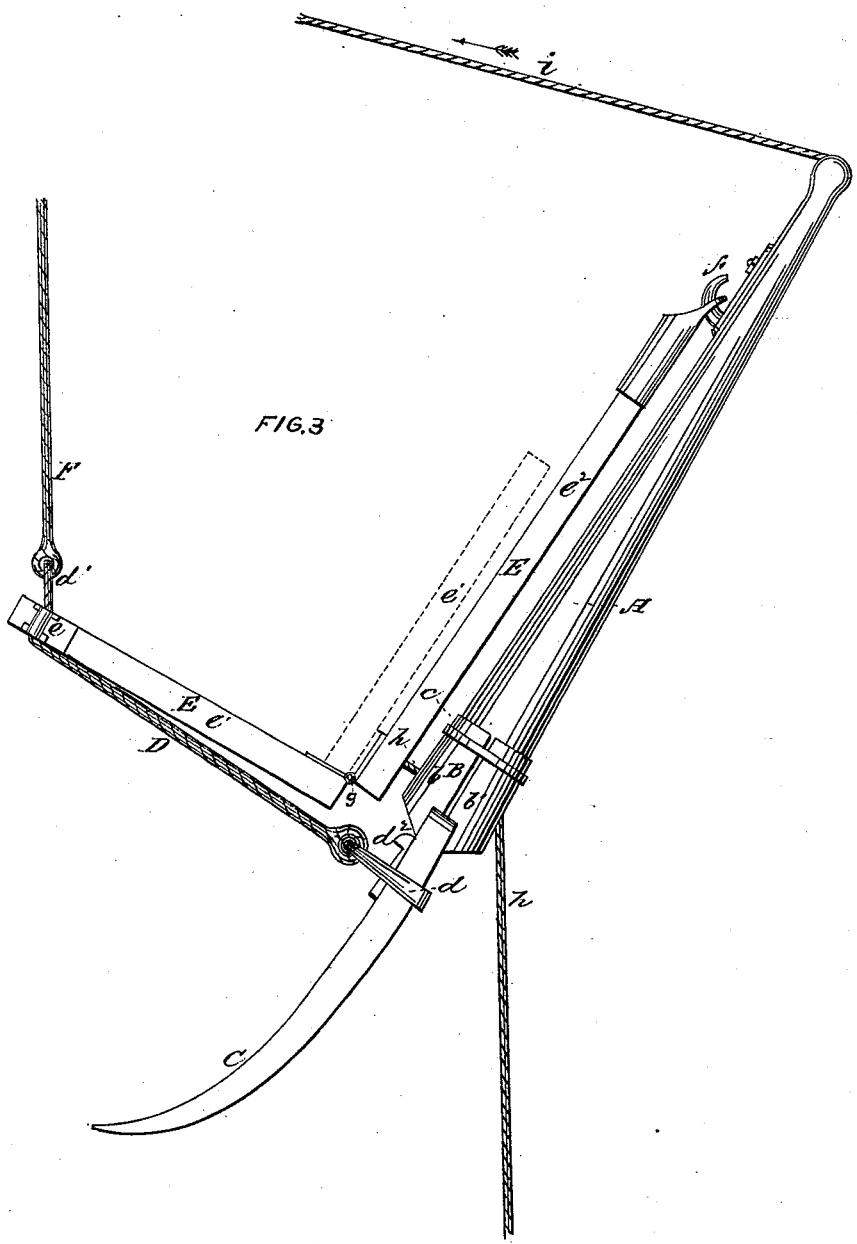

H. H. HATHEWAY, OF CLOCKVILLE, NEW YORK.

Letters Patent No. 64,863, dated May 21, 1867.

IMPROVEMENT IN HORSE HAY-FORKS.

*The Schedule referred to in these Letters Patent and making part of the same.*

TO ALL WHOM IT MAY CONCERN:

Be it known that I, H. H. HATHEWAY, of Clockville, in the county of Madison, and State of New York, have invented a new and improved Horse Hay-Fork; and I do hereby declare that the following is a full, clear, and exact description thereof, which will enable others skilled in the art to make and use the same, reference being had to the accompanying drawings, forming part of this specification.

The object of this invention is to so construct and arrange a hay-fork that it will operate easily, and that the tines will be prevented from coming in contact with beams or other obstructions.

My invention consists, first, in the manner of securing the teeth or tines to the handle, which is done by employing a split ferrule, or one which consists of two parts; the tines are clamped and held between these two half ferrules, and may thus be easily removed for repair or renewal; second, in making the bail, by which the fork is suspended, adjustable in such a manner that the fork can be held and supported at a proper angle at all times, and with loads of different weight. The fork is very easily operated, and, after the load is elevated, the manner of discharging it is exceedingly simple. No springs, latches, or hooks, or other complicating and weakening devices, are employed on my fork. It can be easily converted into a fork with either two, three, or four tines.

Having stated the nature of my invention, I will now proceed to describe its construction and operation, reference being had to the accompanying drawings, in which—

Figure 1 represents a side view of my improved fork when in position of being loaded and elevated.

Figure 2 is a sectional plan or top view of the same, the plane of section indicated by the line $x$ $x$, fig. 1.

Figure 3 is a side view of the fork when in position of being dumped or discharged.

Similar letters of reference indicate like parts.

To the front or lower end of the wooden handle A is attached a ferrule or cap, B, which is made of two pieces, $b$ and $b'$, which are held together by means of bolts and nuts $a$ $a$, and by a ring, $c$, as seen in figs. 1 and 2. Between the caps $b$ and $b'$ are held and secured the tines or prongs C. The outer tines $c^1$ and $c^2$ are connected by the bar $c^3$, and consequently consist of one piece. By removing the centre tine $c^4$ the fork will have but two prongs. By adding another centre prong, $c^4$, the fork will consist of four prongs, $c^4$ $c^4$ $c^1$ $c^2$. The prongs are simply clamped between the caps $b$ and $b'$, and may be easily removed or replaced. On the outer tines slide the rings $d$, to which the bail D is attached. These rings are adjustable on the tines, and are held in place by keys $d^2$, so that the angle of the bail may be changed if needed. The bail D may be made of bar iron, or of wood, or of rope. In the latter case, both ends, which are secured to the two rings $d$ $d$, may be connected at the top, after they pass through a suitable clamping device, $e$, on the brace E, thus forming a loop, $d'$, to which the elevating rope F is attached. The brace E is secured to the rear or upper end of the handle by a universal joint; or it may, as shown in the drawings, swing on a hook, $f$, which is secured to the handle A. The brace consists of two arms, $e^1$ and $e^2$, which are connected by a hinge, $g$, in such a manner that the arms may be folded together, as indicated by dotted lines in fig. 3. A cord, $h$, is attached to the forward end of the arm $e^2$, as seen, and passes through the ferrule B to below. Another cord, $i$, is attached to the rear end of the handle A for the purpose of guiding the fork.

The operation is as follows: When the fork is loaded, it is elevated by means of the rope F, fig. 1. This rope is almost directly over the ends of the tines, and the same are thereby prevented from coming in contact with beams or other obstructions. When elevated high enough, the fork is guided, by means of the cord $i$, towards any desired spot, and then the cord $h$ is pulled; the fork will thereby be brought into the position shown in fig. 3. The arm $e^2$ is pulled towards the handle A; the brace E will thereby loose its leverage and the weight on the tines will press the front end of the fork down and drop off. For loading, the handle A can be easily brought into a vertical position by either pulling the cord $i$ or pushing the handle itself in the direction of the arrow, fig. 3; in that case, the arms $e^1$ and $e^2$ will be folded together, as indicated by dotted lines in fig. 3. By then pulling on the rope F the position shown in fig. 1 will at once be resumed.

Having thus described my invention, what I claim as new, and desire to secure by Letters Patent, is—

1. The manner of securing the tines C to the handle by combining with each other the caps $b$ and $b'$, bolts and nuts $a$ $a$, ring $c$, and handle A, substantially as shown, and operating in the manner described.

2. The adjustable bail D in combination with the rings $d$, keys $d^2$, and brace E, substantially as and for the purpose herein shown and described.

H. H. HATHEWAY.

Witnesses:
G. A. FORBES,
JNO. H. FANCHER.